(12) United States Patent
Madderla et al.

(10) Patent No.: US 11,530,868 B2
(45) Date of Patent: Dec. 20, 2022

(54) HERB STORAGE ASSEMBLY FOR A REFRIGERATOR APPLIANCE

(71) Applicant: Haier US Appliance Solutions, Inc., Wilmington, DE (US)

(72) Inventors: Srikanth Madderla, Hyderabad (IN); Soumya Bhardwaj, Jabalpur (IN); Srinivas Pasham, Hyderabad (IN)

(73) Assignee: Haier US Appliance Solutions, Inc., Wilmington, DE (US)

( * ) Notice: Subject to any disclaimer, the term of this patent is extended or adjusted under 35 U.S.C. 154(b) by 130 days.

(21) Appl. No.: 17/154,351

(22) Filed: Jan. 21, 2021

(65) Prior Publication Data

US 2022/0228798 A1 Jul. 21, 2022

(51) Int. Cl.
*F25D 23/12* (2006.01)
*F16K 1/36* (2006.01)
*F25D 23/02* (2006.01)

(52) U.S. Cl.
CPC ............... *F25D 23/12* (2013.01); *F16K 1/36* (2013.01); *F25D 23/028* (2013.01); *F25D 2331/809* (2013.01)

(58) Field of Classification Search
CPC .. F25D 23/12; F25D 23/028; F25D 2331/809; F25D 23/126; F25D 2323/122; F16K 1/36; B65D 85/50–85/52
See application file for complete search history.

(56) References Cited

U.S. PATENT DOCUMENTS

| 8,151,838 | B2 * | 4/2012 | Seaborne ................ B65D 1/06 141/356 |
| 9,663,264 | B2 | 5/2017 | Springer |
| 2018/0209718 | A1 * | 7/2018 | Staud .................... F25D 23/025 |
| 2019/0337790 | A1 | 11/2019 | Lee |
| 2020/0223683 | A1 * | 7/2020 | Subramanya ........ B67D 1/0888 |

FOREIGN PATENT DOCUMENTS

| DE | 102009045058 A1 | 3/2011 |
| JP | 4248478 B2 | 4/2009 |
| JP | 2017/507094 A | 3/2017 |
| WO | WO2020/108919 A1 | 6/2020 |

* cited by examiner

*Primary Examiner* — Cassey D Bauer
(74) *Attorney, Agent, or Firm* — Dority & Manning, P.A.

(57) ABSTRACT

An herb storage assembly for storing herbs within a refrigerator appliance is provided. The refrigerator appliance includes a chilled chamber and a dispensing assembly including a water supply port for selectively discharging a flow of water. The herb storage assembly includes a lower housing defining a water reservoir and a docking port mounted to the lower housing, the docking port being configured for engaging the water supply port to receive the flow of water into the water reservoir. An herb container is seated at least partially within the water reservoir and defines a storage volume for receiving and storing herbs.

20 Claims, 8 Drawing Sheets

HERB STORAGE ASSEMBLY FOR A REFRIGERATOR APPLIANCE

FIELD OF THE INVENTION

The present subject matter relates generally to refrigerator appliances, and more particularly to herb storage systems for refrigerator appliances.

BACKGROUND OF THE INVENTION

Refrigerator appliances generally include a cabinet that defines a chilled chamber for receipt of food articles for storage. In addition, refrigerator appliances include one or more doors rotatably hinged to the cabinet to permit selective access to food items stored in chilled chamber(s). The refrigerator appliances can also include various storage components mounted within the chilled chamber and designed to facilitate storage of food items therein. Such storage components can include racks, bins, shelves, or drawers that receive food items and assist with organizing and arranging of such food items within the chilled chamber.

Perishable items, such as herbs or vegetables, are frequently stored in a chilled chamber of refrigerator appliances to preserve their freshness. However, such herbs are often precut from their stems, packaged, and sold for home storage and use. As a result, the shelf life of such herbs and vegetables is frequently limited as they are no longer supplied with the necessary water and nutrients to support their growth. These herbs and vegetables may thus have reduced flavor that cannot be fully extracted, or will otherwise wilt, die, or deteriorate. Notably, in addition to resulting in wasted food, these plants and herbs often give off a foul smell that is undesirable to consumers.

Accordingly, a refrigerator appliance with an improved herb storage system would be useful. More particularly, an herb storage assembly that is positioned within the chilled chamber of a refrigerator appliance and includes feature for facilitating improved hydration and an environment for improved freshness of herbs would be particularly beneficial.

BRIEF DESCRIPTION OF THE INVENTION

Advantages of the invention will be set forth in part in the following description, or may be apparent from the description, or may be learned through practice of the invention.

In one exemplary embodiment, a refrigerator appliance is provided including a cabinet defining a chilled chamber, a door being rotatably hinged to the cabinet to provide selective access to the chilled chamber, a dispensing assembly including a water supply port for selectively discharging a flow of water, and an herb storage assembly for storing herbs. The herb storage assembly includes a lower housing defining a water reservoir, a docking port mounted to the lower housing, the docking port being configured for engaging the water supply port to receive the flow of water into the water reservoir, and an herb container defining a storage volume, the herb container being seated at least partially within the water reservoir.

In another exemplary embodiment, an herb storage assembly for storing herbs within an appliance is provided. The appliance includes a dispensing assembly including a water supply port for selectively discharging a flow of water. The herb storage assembly includes a lower housing defining a water reservoir, a docking port mounted to the lower housing, the docking port being configured for engaging the water supply port to receive the flow of water into the water reservoir, and an herb container defining a storage volume, the herb container being seated at least partially within the water reservoir.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
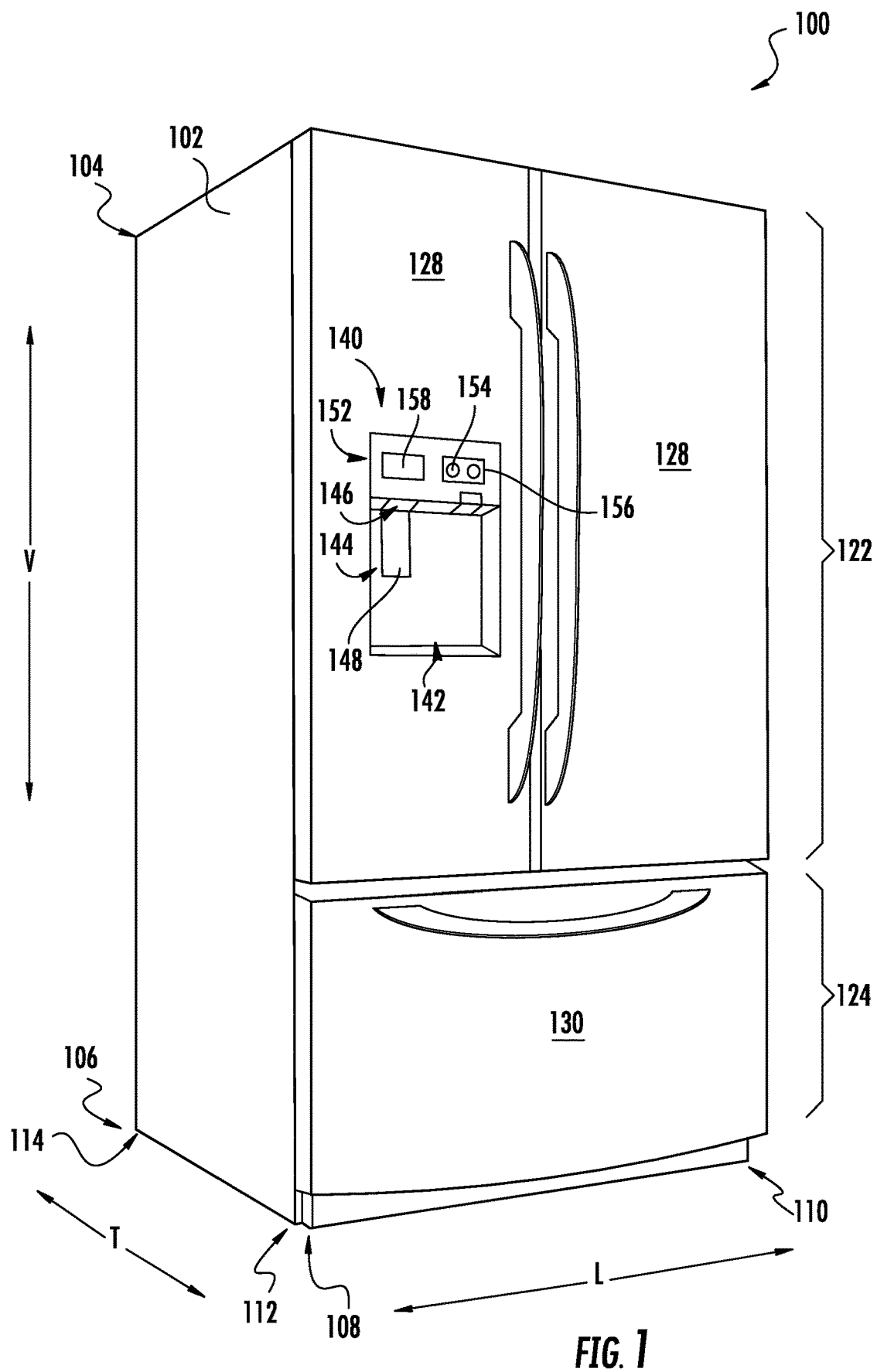
FIG. 1 provides a perspective view of a refrigerator appliance according to an exemplary embodiment of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a 10 percent margin.

FIG. 1 provides a perspective view of a refrigerator appliance 100 according to an exemplary embodiment of the present subject matter. Refrigerator appliance 100 includes a cabinet or housing 102 that extends between a top 104 and a bottom 106 along a vertical direction V, between a first side 108 and a second side 110 along a lateral direction L, and between a front side 112 and a rear side 114 along a transverse direction T. Each of the vertical direction V, lateral direction L, and transverse direction T are mutually perpendicular to one another.

Housing 102 defines chilled chambers for receipt of food items for storage. In particular, housing 102 defines fresh food chamber 122 positioned at or adjacent top 104 of housing 102 and a freezer chamber 124 arranged at or adjacent bottom 106 of housing 102. As such, refrigerator appliance 100 is generally referred to as a bottom mount refrigerator. It is recognized, however, that the benefits of the present disclosure apply to other types and styles of refrigerator appliances such as, e.g., a top mount refrigerator appliance, a side-by-side style refrigerator appliance, or a single door refrigerator appliance. Moreover, aspects of the present subject matter may be applied to other appliances as well, such as other appliances including fluid dispensers. Consequently, the description set forth herein is for illustrative purposes only and is not intended to be limiting in any aspect to any particular appliance or configuration.

Refrigerator doors 128 are rotatably hinged to an edge of housing 102 for selectively accessing fresh food chamber 122. In addition, a freezer door 130 is arranged below refrigerator doors 128 for selectively accessing freezer chamber 124. Freezer door 130 is coupled to a freezer drawer (not shown) slidably mounted within freezer chamber 124. Refrigerator doors 128 and freezer door 130 are shown in the closed configuration in FIG. 1. One skilled in the art will appreciate that other chamber and door configurations are possible and within the scope of the present invention.

Figure 2:
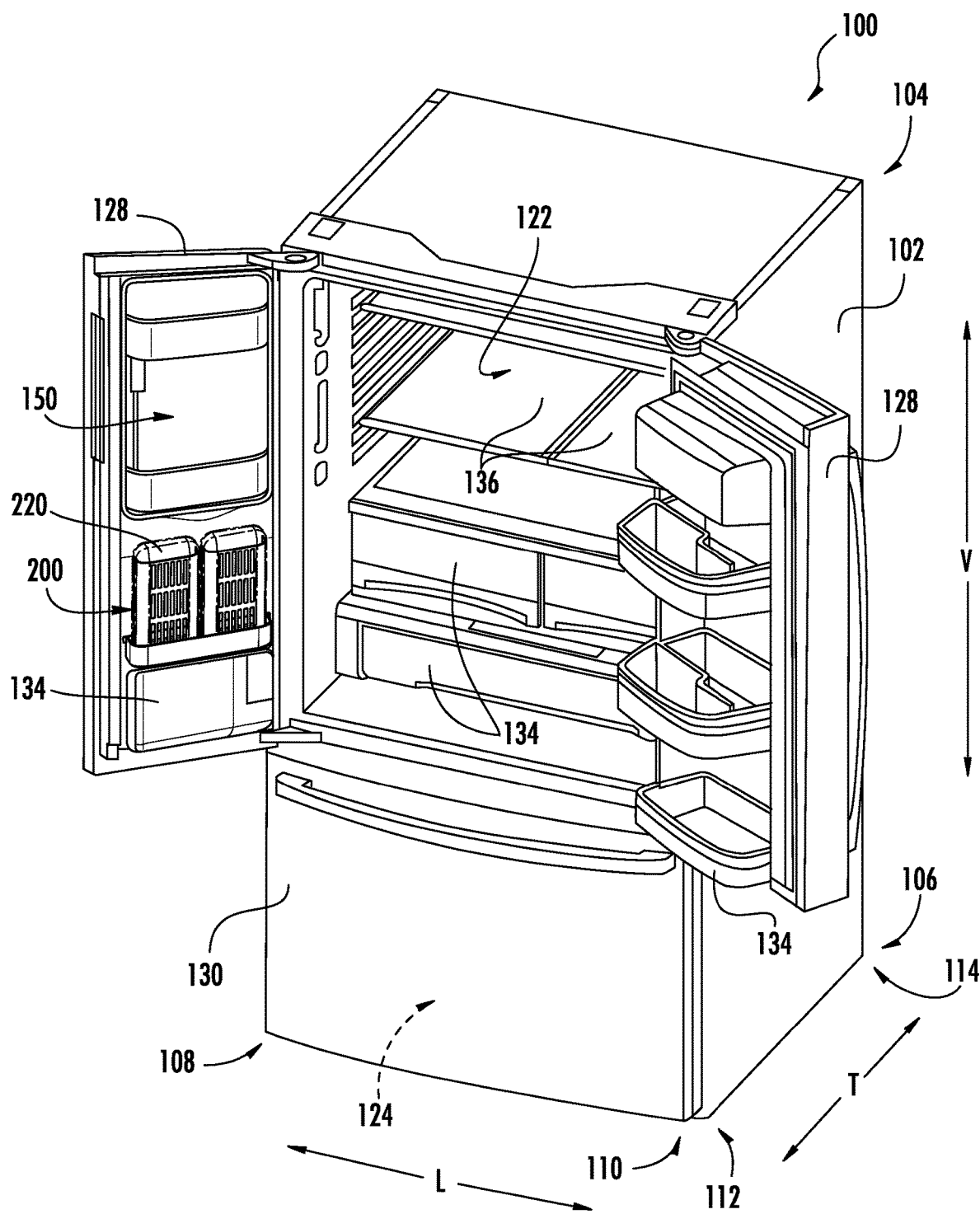
FIG. 2 provides a perspective view of the exemplary refrigerator appliance of FIG. 1, with the doors of the fresh food chamber shown in an open position.
Figure 3:
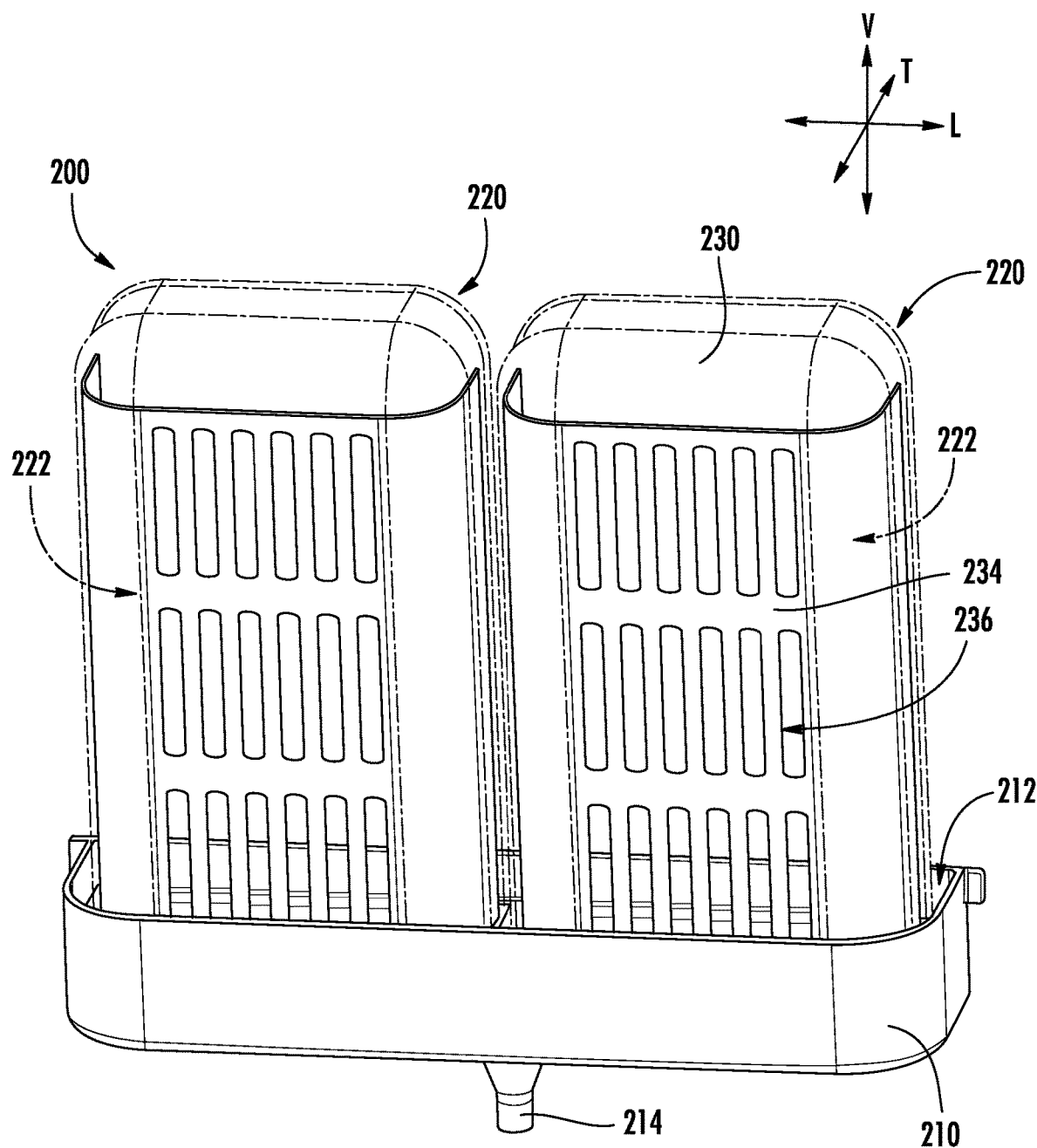
FIG. 3 provides a perspective view of an herb storage assembly that may be used with the exemplary refrigerator appliance of FIG. 1 according to an exemplary embodiment of the present subject matter.

FIG. 2 provides a perspective view of refrigerator appliance 100 shown with refrigerator doors 128 in the open position. As shown in FIG. 2, various storage components are mounted within fresh food chamber 122 to facilitate storage of food items therein as will be understood by those skilled in the art. In particular, the storage components may include bins 134 and shelves 136. Each of these storage components are configured for receipt of food items (e.g., beverages and/or solid food items) and may assist with organizing such food items. As illustrated, bins 134 may be mounted on refrigerator doors 128 or may slide into a receiving space in fresh food chamber 122. It should be appreciated that the illustrated storage components are used only for the purpose of explanation and that other storage components may be used and may have different sizes, shapes, and configurations.

Referring again to FIG. 1, a dispensing assembly 140 will be described according to exemplary embodiments of the present subject matter. Although several different exemplary embodiments of dispensing assembly 140 will be illustrated and described, similar reference numerals may be used to refer to similar components and features. Dispensing assembly 140 is generally configured for dispensing liquid water and/or ice. Although an exemplary dispensing assembly 140 is illustrated and described herein, it should be appreciated that variations and modifications may be made to dispensing assembly 140 while remaining within the present subject matter.

Dispensing assembly 140 and its various components may be positioned at least in part within a dispenser recess 142 defined on one of refrigerator doors 128. In this regard, dispenser recess 142 is defined on a front side 112 of refrigerator appliance 100 such that a user may operate dispensing assembly 140 without opening refrigerator door 128. In addition, dispenser recess 142 is positioned at a predetermined elevation convenient for a user to access ice and enabling the user to access ice without the need to bend-over. In the exemplary embodiment, dispenser recess 142 is positioned at a level that approximates the chest level of a user.

Dispensing assembly 140 includes an ice dispenser 144 including a discharging outlet 146 for discharging ice from dispensing assembly 140. An actuating mechanism 148, shown as a paddle, is mounted below discharging outlet 146 for operating ice or water dispenser 144. In alternative exemplary embodiments, any suitable actuating mechanism may be used to operate ice dispenser 144. For example, ice dispenser 144 can include a sensor (such as an ultrasonic sensor) or a button rather than the paddle. Discharging outlet 146 and actuating mechanism 148 are an external part of ice dispenser 144 and are mounted in dispenser recess 142. By contrast, refrigerator door 128 may define an icebox compartment 150 (FIG. 2) housing an icemaker and an ice storage bin (not shown) that are configured to supply ice to dispenser recess 142.

A control panel 152 is provided for controlling the mode of operation. For example, control panel 152 includes one or more selector inputs 154, such as knobs, buttons, touchscreen interfaces, etc., such as a water dispensing button and an ice-dispensing button, for selecting a desired mode of operation such as crushed or non-crushed ice. In addition, inputs 154 may be used to specify a fill volume or method of operating dispensing assembly 140. In this regard, inputs 154 may be in communication with a processing device or controller 156. Signals generated in controller 156 operate refrigerator appliance 100 and dispensing assembly 140 in response to selector inputs 154. Additionally, a display 158, such as an indicator light or a screen, may be provided on control panel 152. Display 158 may be in communication with controller 156, and may display information in response to signals from controller 156.

As used herein, "processing device" or "controller" may refer to one or more microprocessors or semiconductor devices and is not restricted necessarily to a single element. The processing device can be programmed to operate refrigerator appliance 100, dispensing assembly 140 and other components of refrigerator appliance 100. The processing device may include, or be associated with, one or more memory elements (e.g., non-transitory storage media). In some such embodiments, the memory elements include electrically erasable, programmable read only memory (EEPROM). Generally, the memory elements can store information accessible processing device, including instructions that can be executed by processing device. Optionally, the instructions can be software or any set of instructions and/or data that when executed by the processing device, cause the processing device to perform operations.

Referring now generally to FIGS. 2 through 9, an herb storage assembly 200 which may be used with refrigerator appliance 100 will be described according to exemplary embodiments of the present subject matter. Specifically, herb storage assembly 200 may be used with dispensing assembly 140 of refrigerator appliance 100 for containing, hydrating, and maintaining a suitable environment for one or more herbs, plants, or other perishable goods. Although herb storage assembly 200 will be described below according to exemplary embodiments the present subject matter, it should be appreciated that variations and modifications may be made to herb storage assembly 200 while remaining within the scope of the present subject matter.

According to exemplary embodiments of the present subject matter, herb storage assembly 200 may generally be operably coupled with dispensing assembly 140 of refrigerator appliance 100 for receiving water for hydration or other nutrients. Specifically, according to the illustrated embodiment, herb storage assembly 200 may be mounted within refrigerator door 128 (see FIG. 2) such that it is fluidly coupled to a water supply port 202 (see FIG. 7), which will be described in more detail below. When herb storage assembly 200 is mounted within refrigerator door 128, dispensing assembly 140 may selectively discharge a flow of water (e.g., as identified generally by reference numeral 204) into herb storage assembly 200 to hydrate herbs or plants.

Although the exemplary embodiment herein describes herb storage assembly 200 as being mounted within refrigerator door 128 and being seated on a water supply port 202, it should be appreciated that according to alternative embodiments, herb storage assembly 200 may be mounted at any other suitable location within or around refrigerator appliance 100 and may be fluidly coupled to dispensing assembly 140 or any other water supply in any other suitable manner. Furthermore, it should be appreciated that dispensing assembly 140 may include any suitable number of valves, plumbing configurations, and other flow control devices for regulating the flow of water 204 to herb storage assembly 200.

Moreover, according to exemplary embodiments, herb storage assembly 200 may have dedicated valves or flow control devices for regulating the flow of water 204. For example, as illustrated schematically in FIG. 7, herb storage assembly 200 may include a water supply valve 206 that is fluidly coupled to water supply port 202 for selectively providing the flow of water 204 through the water supply port 202. The embodiments described herein are intended only for the purpose of explanation and are not intended to limit the scope of the present subject matter in any manner.

Referring now specifically to FIGS. 3 through 9, herb storage assembly 200 will be described in more detail according to an exemplary embodiment of the present subject matter. As shown, herb storage assembly 200 generally includes a lower housing 210 that defines a water reservoir 212 that is generally configured for receiving and containing the flow of water 204. In addition, a docking port 214 may be mounted to or otherwise operably coupled with lower housing 210. In general, docking port 214 is configured for engaging water supply port 202 to receive the flow of water 204 from dispensing assembly 140 into water reservoir 212. Specifically, as shown schematically in FIG. 7, a water supply port 202 may be defined within refrigerator door 128, e.g., at a base of a storage bin 134.

In general, water supply port 202 is a complementary fluid port configured for receiving docking port 214 and which may include one or more resilient sealing elements, such as O-ring 216, for creating a fluid seal between docking port 214 and water supply port 202. In this manner, when dispensing assembly 140 dispenses flow of water 204, the entire flow passes directly into water reservoir 212 with little or no leakage. Notably, lower housing 210 may generally be removed from refrigerator door 128 by pulling lower housing 210 and docking port 214 upward and away from water supply port 202, e.g., to facilitate cleaning of water reservoir 212, maintenance of herb storage assembly 200, etc.

Referring still to FIGS. 3 through 9, herb storage assembly 200 may further include one or more herb containers 220 that define a storage volume 222 for receiving herbs. Although storage volume 222 is generally described herein as receiving herbs, it should be appreciated that aspects of the present subject matter may be applied to the storage or any other suitable food items, such as vegetables, other perishable items, etc. It should be appreciated that herb storage assembly 200 may include any suitable number of herb containers 220 positioned within lower housing 210, and each container may contain any suitable number of sub compartments, herb support features, features for engaging lower housing 210, etc. Moreover, it should be appreciated that each of these herb containers 220 may be independently removable, e.g., to add fresh herbs, to clean herb container 220, the facilitate maintenance of herb storage assembly 200, etc.

As shown, each herb container 220 may include a front cover 230 and a rear panel 232 that are joined to form storage volume 222. In practice, rear panel 232 and front cover 230 are separable, e.g., to permit a user to insert herbs into storage volume 222. In addition, each herb container 220 may include a grill 234 that is positioned within storage volume 222. In general, grill 234 may have a size and shape similar to the front cover 230, but may define a plurality of grill apertures 236 to help support herbs in a vertical orientation.

In addition, grill 234 may be removable from front cover 230, e.g., such that a user may place herbs onto grill 234 and may clean them by running water over them before installing grill 234 into front cover 230. It should be appreciated that variations and modifications to herb containers 220 may be made while remaining within the scope of the present subject matter. In addition, it should be appreciated that the size, shape and configuration of each herb container 220 may vary as needed depending on the type or volume of herbs being stored. According to exemplary embodiments, front cover 230 may be transparent to facilitate viewing of herbs, e.g., to monitor freshness.

As shown, herb container 220 is configured for being seated at least partially within water reservoir 212. In this manner, for example, a bottom end of front cover 230 may define a plurality of cover apertures 240 that are positioned within lower housing 210 such that water 204 within water reservoir 212 may enter storage volume 222. In general, the flow of water 204 may be provided into water reservoir 212 until the water reaches into storage volume 222 through cover apertures 240. According to still other embodiments, cover apertures 240 may be sized and configured for receiving stems of the herbs that are provided into storage volume 222. In either case, herbs stored within storage volume 222 may be exposed to water and nutrients within water reservoir 212.

Figure 4:
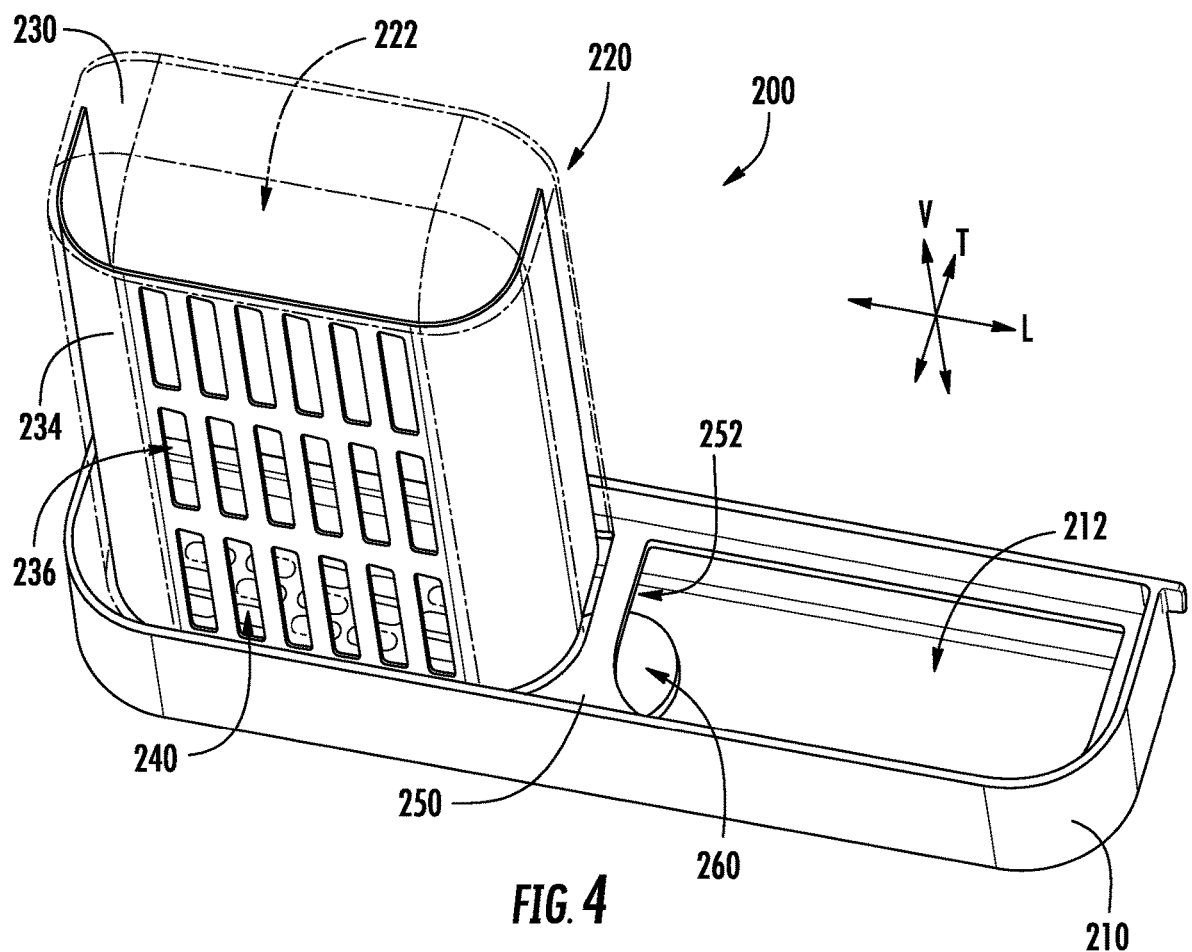
FIG. 4 provides a perspective view of the exemplary herb storage assembly of FIG. 3, with a lower housing and herb container removed for clarity according to an exemplary embodiment of the present subject matter.
Figure 5:
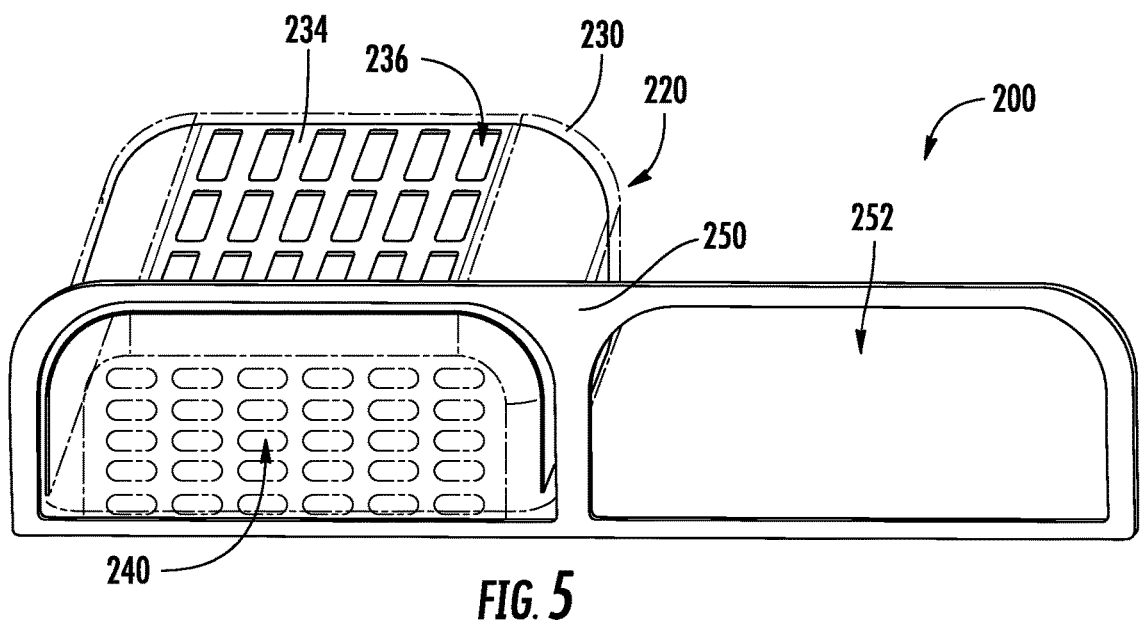
FIG. 5 provides a bottom perspective view of the exemplary herb storage assembly of FIG. 3, with the lower housing and an herb container removed for clarity according to an exemplary embodiment of the present subject matter.
Figure 6:
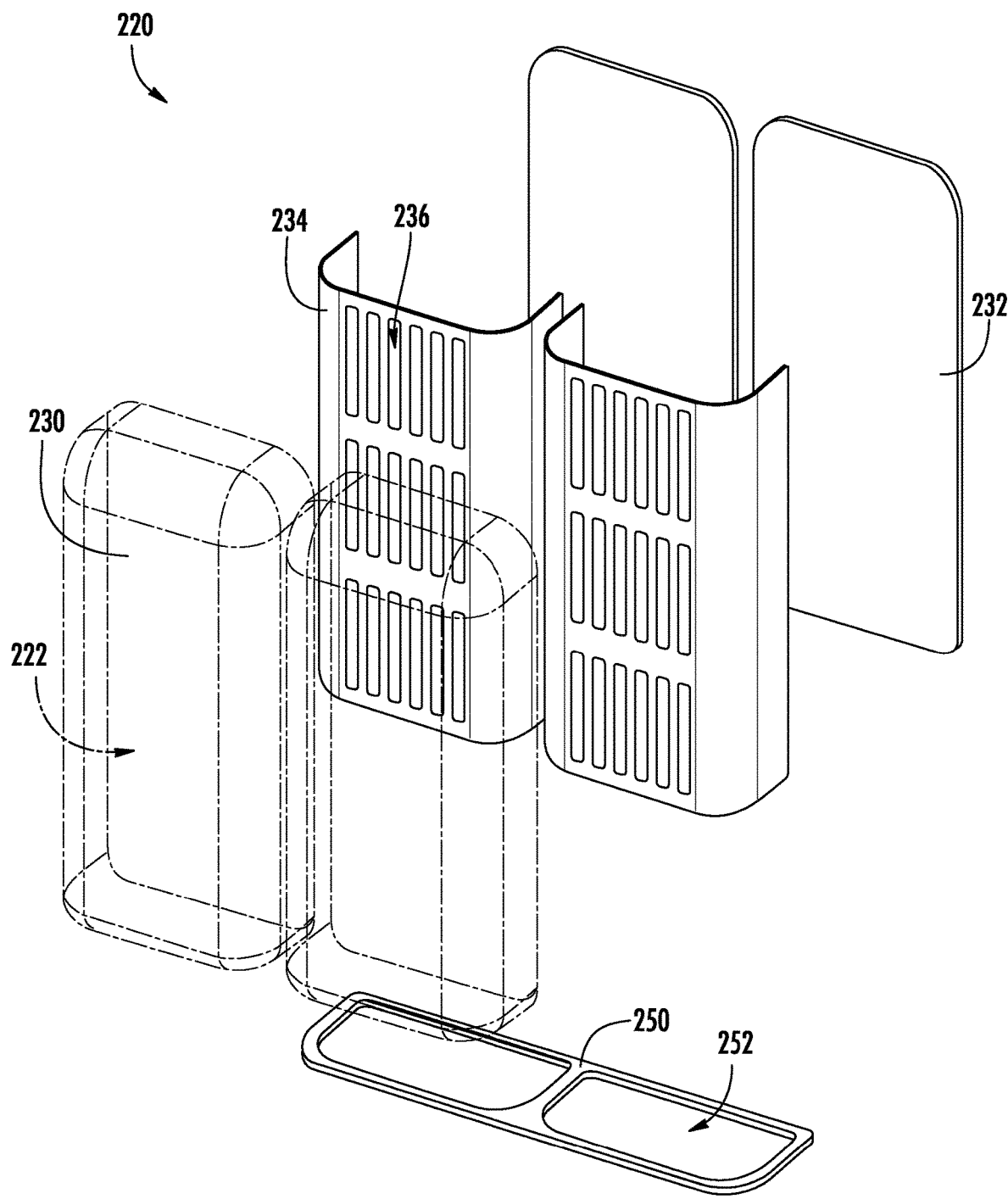
FIG. 6 provides an exploded perspective view of the exemplary herb storage assembly of FIG. 3 according to an exemplary embodiment of the present subject matter.

As best shown in FIGS. 4 through 6, herb storage assembly 200 may further include a sealing element 250 is positioned within lower housing 210 that is generally configured for providing a fluid seal between lower housing 210 and herb containers 220. In this regard, sealing element 250 may generally be a resilient member that is mounted to or formed integrally with lower housing 210 and which defines one or more gasket apertures 252 that are configured for securely receiving herb containers 220. Specifically, according to the illustrated embodiment, herb storage assembly 200 includes two herb containers 220 and sealing element 250 defines two complementary gasket apertures 252 for receiving those herb containers 220. It should be appreciated that the size and geometry of herb containers 220 may vary along with the size and geometry of gasket apertures 252, e.g., to support different size herb containers 220 for receiving different types of herbs.

Specifically, according to exemplary embodiments, sealing element 250 may define an interference fit with herb containers 220. In this regard, gasket apertures 252 may be slightly undersized relative to herb containers 220 such that friction between sealing element 250 and herb containers 220 may maintain herb containers 220 in place. According to still other embodiments, sealing gasket may define a tapered interface for engaging and stopping herb containers 220 after they are inserted to a certain location within lower housing 210. According still other embodiments, lower housing 210 and herb containers 220 may define any other suitable complementary features for ensuring that a user does not push herb containers 220 too far into lower housing 210, e.g., to prevent crushing of the herb stems.

Figure 7:
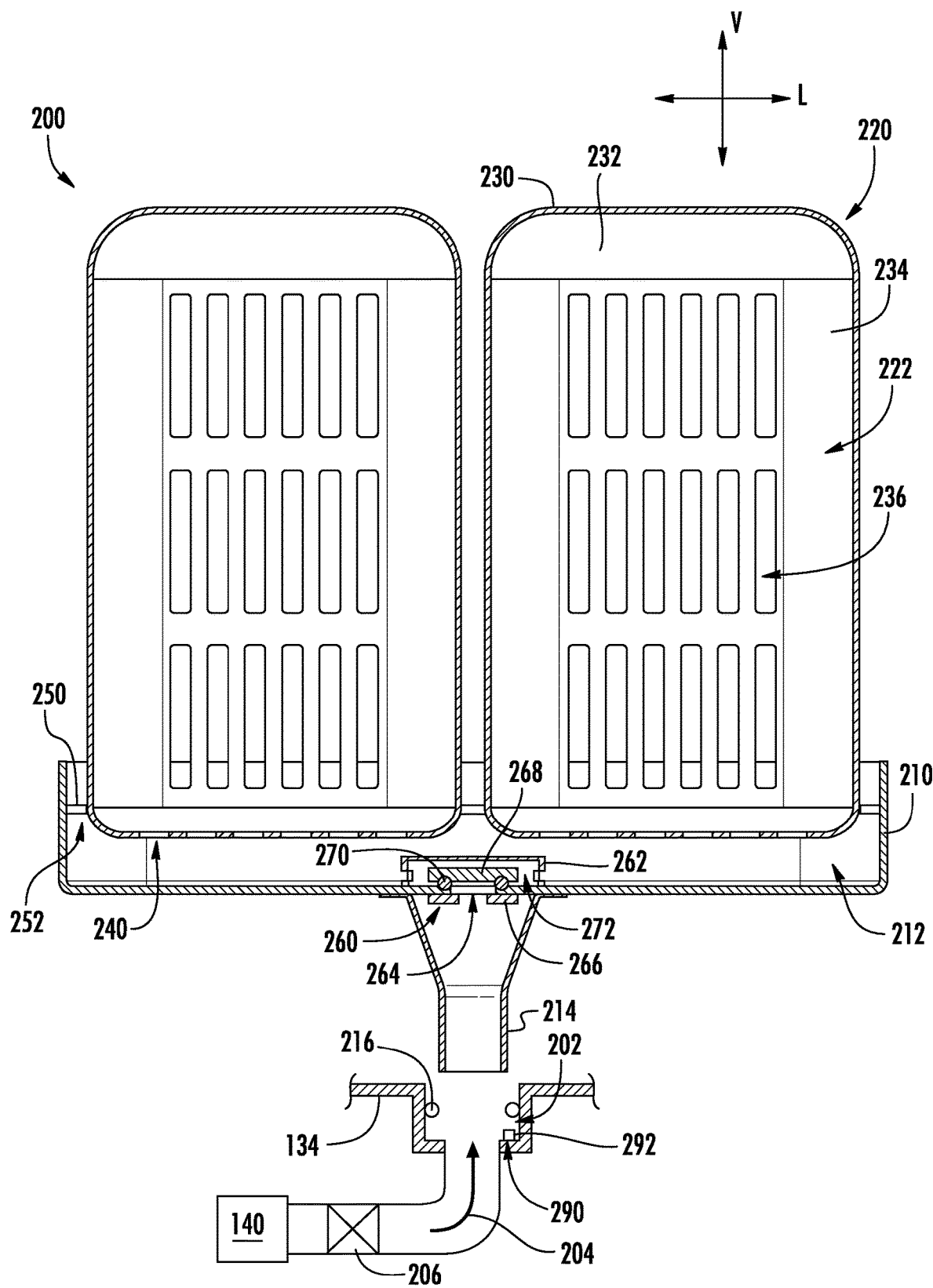
FIG. 7 provides a cross-sectional view of the exemplary herb storage assembly of FIG. 3 according to an exemplary embodiment of the present subject matter.
Figure 8:
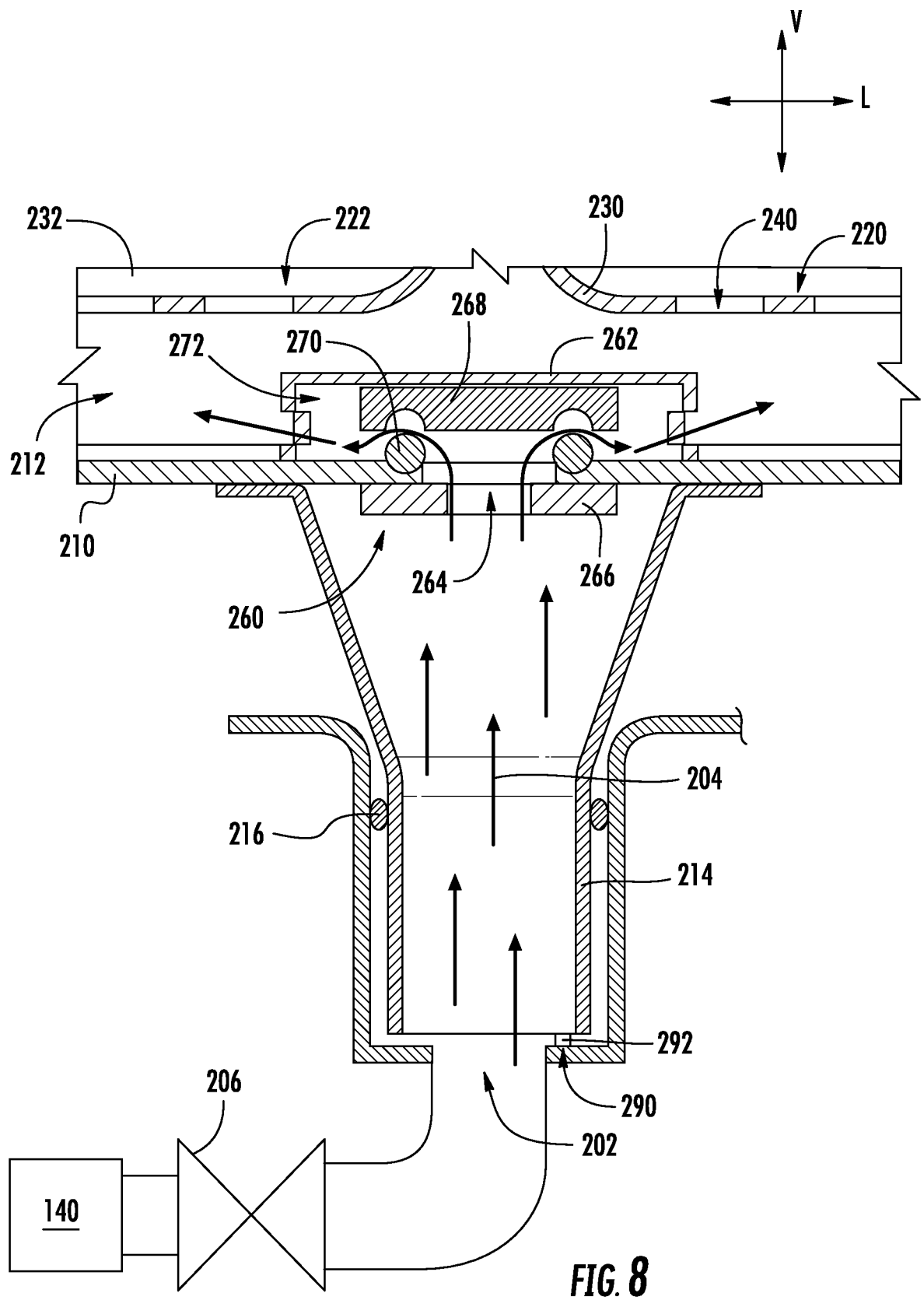
FIG. 8 provides a cross-sectional view of a one-way valve of the exemplary herb storage assembly of FIG. 3 according to an exemplary embodiment of the present subject matter.
Figure 9:
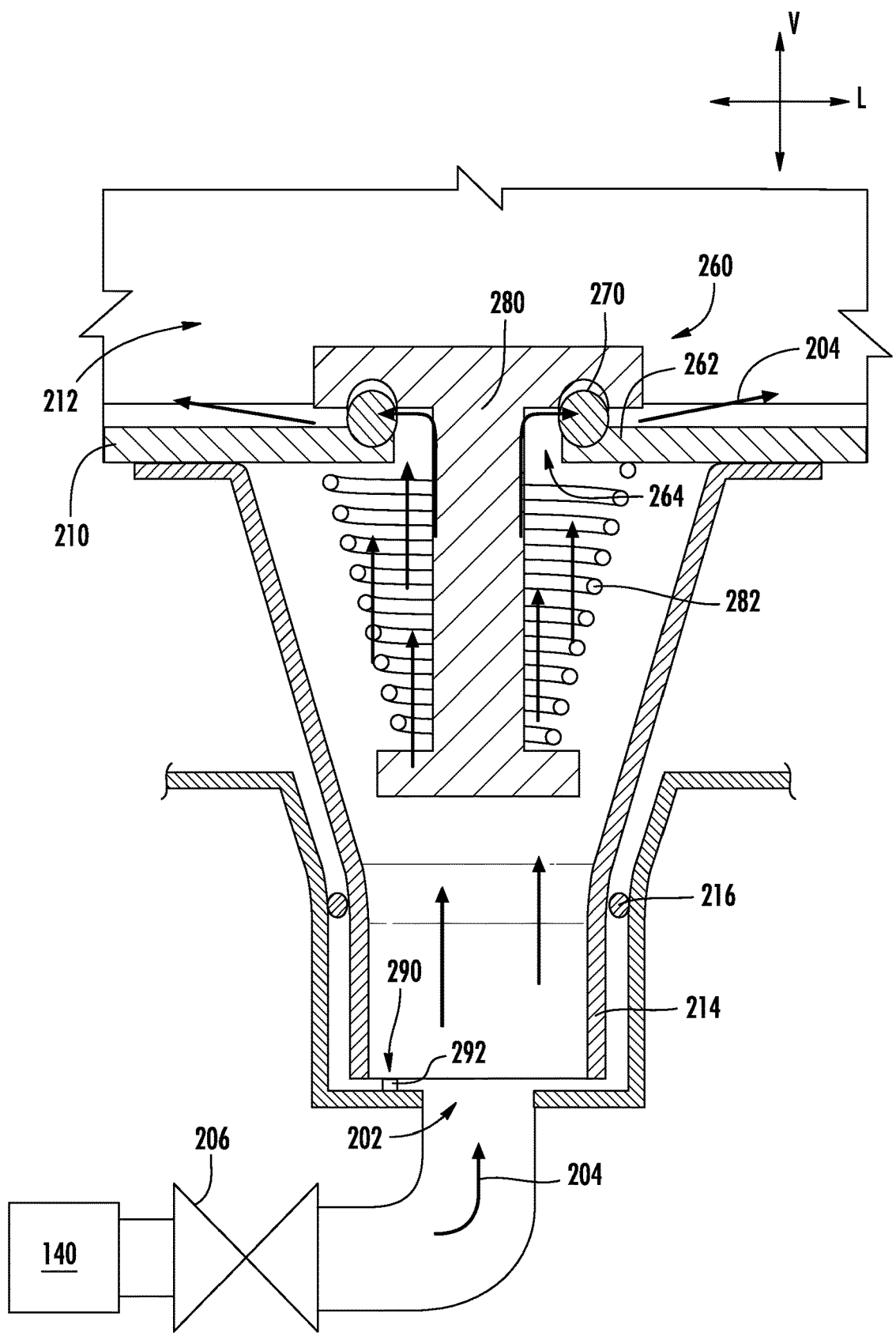
FIG. 9 provides a cross-sectional view of another one-way valve of the exemplary herb storage assembly of FIG. 3 according to an exemplary embodiment of the present subject matter.

According to exemplary embodiments of the present subject matter, herb storage assembly 200 may further include features for preventing the flow of water 204 from passing from water reservoir 212 through docking port 214. For example, as best shown in FIGS. 7 through 9, herb storage assembly 200 may include a one-way valve 260 that is mounted within docking port 214 for preventing the flow of water 204 from passing in the reverse direction toward dispensing assembly 140, e.g. from waters reservoir 212 through docking port 214. In this manner, for example, water 204 that is present within water reservoir 212 cannot flow back into dispensing assembly 140, thereby contaminating water stored or provided therein. In addition, one-way valve 260 may permit a user to remove lower housing 210 without permitting water stored in water reservoir 212 from draining out of lower housing 210. In this manner, a user may carry lower housing 210 to the sink or other drain before dumping the water out of water reservoir 212.

Specifically, according to the embodiment illustrated in FIGS. 7 and 8, one-way valve 260 generally includes a mounting body 262 that defines an inlet aperture 264 that provides fluid communication between docking port 214 and water reservoir 212. In addition, one-way valve 260 may include a fixed magnet 266 and a floating magnet 268 that are positioned on opposite sides of lower housing 210 and are magnetically attracted to each other. Finally, one-way valve 260 may define a fluid seal 270, such as an O-ring for providing a fluid seal with floating magnet 268 in the sealed position. More specifically, floating magnet 268 is generally movable within a magnet reservoir 272 between an open or unsealed position (e.g., as shown in FIG. 8) and a closed or sealed position (e.g., as shown in FIG. 7). According to exemplary embodiments, floating magnet 260 is moved between the unsealed in the sealed position under pressure of the flow of water 204. Thus, when water supply valve 206 is open and the flow of water 204 is provided toward water reservoir 212, the force of the flow of water 204 pushes floating magnet 268 into the unsealed position. However, when water supply valve 206 is closed, the magnetic force between fixed magnet 266 and floating magnet 268 urges floating magnet 268 against fluid seal 270 to prevent water 204 from exiting water reservoir 212 through docking port 214.

According to an alternative embodiment of the present subject matter, one-way valve 260 may be a spring-actuated valve. In this regard, referring generally to FIG. 9, with like reference numerals referring to the same or similar features, one-way valve 260 may include a plunger valve 280 that is slidably positioned within inlet aperture 264 and is movable between a sealed position and then unsealed position. In addition, one-way valve 260 may include a resilient element, such as a mechanical spring 282 that generally urges plunger valve 280 toward the sealed position. In this manner, plunger valve 280 is typically sealed against mounting body 262 and/or lower housing 210 to prevent the flow of water 204 from passing through inlet aperture 264. However, when water supply valve 206 is open and the flow of water 204 is being supplied, the force of the flow of water 204 compresses mechanical spring 282 in order to permit the flow of water 204 to pass into water reservoir 212. It should be appreciated that other one-way valves are possible and within the scope of the present subject matter.

Referring now specifically to FIG. 7, herb storage assembly 200 may further include a presence sensor 290 which is generally configured for detecting the presence of the herbs, the presence of water, or the presence of anything else positioned within herb storage assembly 200. In this regard, presence sensor 290 is illustrated as a load cell 292 that is configured for measuring the weight of lower housing 210 that is exerted within water supply port 202. Although load cell 292 is illustrated, it should be appreciated that various other sensors may be used to detect the presence of the herbs or water 204, such as optical sensors, electrical conductivity sensors, pushbutton switches, etc.

In general, presence sensor 290 may be used by a controller, such as controller 156 of refrigerator appliance 100 to determine when to dispense the flow of water 204 into water reservoir 212. For example, if herb container 220 is removed from lower housing 210 and then reinstalled with a heavier weight, controller 156 may know that herbs have been added to herb storage assembly 200. As result, controller 156 may open water supply valve 206 or may otherwise dispense water from dispensing assembly 140 to fill water reservoir 212 to a desired level for hydrating the herbs. In this regard, the dispensing assembly 140 may be operated for a specific amount of time such that a desired volume of water is added, or dispensing assembly 140 may be operated until a weight measured by load cell 292 reaches a target weight.

Controller 156 may be further programmed to provide user instructions regarding the use of herb storage assembly 200. In this regard, for example, it may be desirable to dump and replace the water 204 within water reservoir 212 periodically. Therefore, according to exemplary embodiments, controller 156 may track how long water has been within water reservoir 212 and may instruct the user to replace the water at a predetermined time period. This notification may be made via a user interface, such as a display 158, or through a remote notification to a remote device, such as a push notification to a cell phone. According to still other exemplary embodiments, controller 156 may be programmed to provide a user notification, reminder, and/or request that the user change the water in water reservoir 212. Specifically, such a notification may be made by displaying information on a human machine interface (HMI, such as display 158 or another suitable interactive display screen) or through a mobile application on a cell phone (e.g., where the water change notification is sent as a reminder in the application). Other means for providing such a user notification are possible and within the scope of the present subject matter.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator appliance comprising:
   a cabinet defining a chilled chamber;
   a door being rotatably hinged to the cabinet to provide selective access to the chilled chamber;
   a dispensing assembly comprising a water supply port for selectively discharging a flow of water; and
   an herb storage assembly for storing herbs, the herb storage assembly comprising:
      a lower housing defining a water reservoir;
      a docking port mounted to the lower housing, the docking port being configured for engaging the water supply port to receive the flow of water into the water reservoir; and
      an herb container defining a storage volume, the herb container being seated at least partially within the water reservoir.

2. The refrigerator appliance of claim 1, wherein the herb storage assembly further comprises:
   a sealing element positioned within the lower housing for providing a fluid seal between the lower housing and the herb container.

3. The refrigerator appliance of claim 2, wherein the sealing element defines a gasket aperture, the gasket aperture being configured for engaging and supporting the herb container.

4. The refrigerator appliance of claim 2, wherein the herb storage assembly comprises:
   a plurality of herb containers, and wherein the sealing element defines a plurality of gasket apertures for receiving the plurality of herb containers.

5. The refrigerator appliance of claim 1, wherein the herb storage assembly further comprises:
   a grill positioned within the storage volume for supporting the herbs.

6. The refrigerator appliance of claim 1, wherein the herb container is removable from the lower housing.

7. The refrigerator appliance of claim 1, wherein the herb storage assembly further comprises:
   a front cover that defines a plurality of apertures providing fluid communication between the storage volume and the water reservoir.

8. The refrigerator appliance of claim 1, wherein the plurality of apertures is configured for receiving stems of the herbs into the water reservoir.

9. The refrigerator appliance of claim 7, wherein the front cover is transparent.

10. The refrigerator appliance of claim 1, wherein the herb storage assembly further comprises:
    a one-way valve mounted within the docking port for preventing the flow of water from the water reservoir into the water supply port.

11. The refrigerator appliance of claim 10, wherein the one-way valve comprises:
    a mounting body defining an inlet aperture;
    a plunger valve slidably positioned within the inlet aperture and being movable between a sealed position and an unsealed position; and
    a resilient element operably coupled to the plunger valve and being configured to urge the plunger valve toward the sealed position, wherein the flow of water passing into the water reservoir compresses the resilient element to move the plunger valve to the unsealed position.

12. The refrigerator appliance of claim 10, wherein the one-way valve comprises:
    a mounting body defining an inlet aperture;
    a fixed annular magnet positioned around the inlet aperture; and
    a floating magnet positioned over the inlet aperture and being movable between a sealed position and an unsealed position, wherein the flow of water displaces the floating magnet to allow the flow of water to fill the water reservoir.

13. The refrigerator appliance of claim 1, wherein the herb storage assembly further comprises:
    a presence sensor that is configured for detecting the presence of the herb container within the lower housing.

14. The refrigerator appliance of claim 13, wherein the presence sensor is a load cell.

15. The refrigerator appliance of claim 1, wherein the refrigerator appliance comprises:
    a water supply valve fluidly coupled to the water supply port for selectively providing a flow of water through the water supply port.

16. The refrigerator appliance of claim 1, wherein the lower housing is removably mounted to the water supply port.

17. The refrigerator appliance of claim 1, wherein the herb storage assembly is mounted to the door of the refrigerator appliance.

18. An herb storage assembly for storing herbs within an appliance, the appliance comprising a dispensing assembly comprising a water supply port for selectively discharging a flow of water, the herb storage assembly comprising:
    a lower housing defining a water reservoir;
    a docking port mounted to the lower housing, the docking port being configured for engaging the water supply port to receive the flow of water into the water reservoir; and
    an herb container defining a storage volume, the herb container being seated at least partially within the water reservoir.

19. The herb storage assembly of claim 18, further comprising:
    a sealing element positioned within the lower housing for providing a fluid seal between the lower housing and the herb container.

20. The herb storage assembly of claim 18, further comprising:
a one-way valve mounted within the docking port for preventing the flow of water from the water reservoir into the water supply port.

* * * * *